(12) United States Patent
Avancha et al.

(10) Patent No.: US 10,929,481 B2
(45) Date of Patent: Feb. 23, 2021

(54) SYSTEM AND METHOD FOR COGNITIVE AGENT-BASED USER SEARCH BEHAVIOR MODELING

(71) Applicant: International Business Machines Corporation, Armonk, NY (US)

(72) Inventors: Rashmi Avancha, Foster City, CA (US); James E. Bostick, Cedar Park, TX (US); Wing L. Leung, Austin, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 15/342,768

(22) Filed: Nov. 3, 2016

(65) Prior Publication Data

US 2018/0121542 A1    May 3, 2018

(51) Int. Cl.
*G06F 16/951*    (2019.01)
*G06F 40/20*    (2020.01)
*G06N 5/02*    (2006.01)
*G06N 5/04*    (2006.01)

(52) U.S. Cl.
CPC .......... *G06F 16/951* (2019.01); *G06N 5/022* (2013.01); *G06F 40/20* (2020.01); *G06N 5/04* (2013.01)

(58) Field of Classification Search
CPC ............. G06F 16/9535; G06F 21/6254; G06F 16/2455
See application file for complete search history.

(56) References Cited

U.S. PATENT DOCUMENTS

| | | | |
|---|---|---|---|
| 8,301,764 B2 | 10/2012 | Konig et al. | |
| 8,386,476 B2* | 2/2013 | Shuster | G06F 3/04842 707/722 |
| 8,428,908 B2 | 4/2013 | Lawler et al. | |
| 8,694,493 B2 | 4/2014 | Shuster | |
| 8,700,604 B2 | 4/2014 | Roseman et al. | |
| 9,081,953 B2 | 7/2015 | B'Far et al. | |
| 9,384,356 B2 | 7/2016 | Simske | |
| 9,830,391 B1* | 11/2017 | Bakir | G06F 16/951 |
| 2008/0005264 A1* | 1/2008 | Brunell | G06F 21/6254 709/217 |
| 2010/0169294 A1 | 7/2010 | Gerber | |
| 2010/0306854 A1 | 12/2010 | Neergaard | |
| 2011/0179011 A1 | 7/2011 | Cardno et al. | |

(Continued)

OTHER PUBLICATIONS

Toubiana et al. ("TrackMeNot: Enhancing the privacy of Web Search"; date: Sep. 22, 2011) (Year: 2011).*

(Continued)

*Primary Examiner* — Ken Hoang
(74) *Attorney, Agent, or Firm* — Terrile, Cannatti & Chambers, LLP; Michael Rocco Cannatti

(57) ABSTRACT

A method, system and a computer program product are provided for obscuring web searches by performing cognitive analysis on one or more user search inquiries from a first user to identify a user search behavior profile for the first user, and then generating one or more obfuscating search inquiries consistent with the user behavior search profile for the first user for issuance with the user search inquiries to impair the search engine from accurately characterizing search information related to the first user.

19 Claims, 3 Drawing Sheets

(56) References Cited

U.S. PATENT DOCUMENTS

| | | | | |
|---|---|---|---|---|
| 2014/0019443 | A1* | 1/2014 | Golshan | G06F 16/9535 707/723 |
| 2014/0149322 | A1 | 5/2014 | LaVoie et al. | |
| 2015/0161255 | A1* | 6/2015 | Battle | G06F 16/9535 707/706 |
| 2015/0324434 | A1* | 11/2015 | Greenwood | G06F 16/248 707/722 |
| 2016/0092699 | A1 | 3/2016 | Riva et al. | |
| 2016/0217195 | A1* | 7/2016 | Abrahams | H04L 67/306 |

OTHER PUBLICATIONS ip.com, IBM, Secret Searching, IPCOM000143711, Dec. 5, 2006.
ip.com, Anonymous, Services for Providing Enterprise Security Enhancement, IPCOM000202163, Dec. 6, 2010.
ip.com, Anonymous, A Method to Obfuscate Log Files Without Losing Context and Fidelity Necessary for Problem Resolution, IPCOM000239777, Dec. 1, 2014.
Balsa, E. et al., OB-PWS: Obfuscation-Based Private Web Search, IEEE 2012 Symposium on Security and Privacy, 2012, http://www.ieee-security.org/TC/SP2012/papers/4681a491.pdf.
Trackmenot, https://cs.nyu.edu/trackmenot/faq.html#options, printed Jun. 27, 2016.
Domingo-Ferrer, J. et al., GooPIR, http://unescoprivacychair.urv.cat/goopir_dir/manual_eng.pdf, Nov. 2008.
High, R., "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM AND METHOD FOR COGNITIVE AGENT-BASED USER SEARCH BEHAVIOR MODELING

BACKGROUND OF THE INVENTION

The present application relates generally to an improved data processing apparatus and method. In one aspect, the present application relates to generating web searches with enhanced privacy and security protections.

Online services, such as web search and advertising, are becoming increasingly personalized as larger search firms (e.g., Google, Bing, Yahoo, etc.) consolidate web searches to learn more about an individual. To provide improved search results, tailored advertisements, and/or personalized content for an improved customer experience to the user, these online services use data mining techniques to build user profiles (containing, for example, web sites frequently visited, user interests, demographics information, location and so forth) by tracking multiple online activities from the same user and linking them together using various techniques, albeit usually under poorly informed user consent.

As the extent and sophistication of data mining techniques increases, there is a growing security and privacy interest from individual users in preventing this level of examination into their web searches. For example, an individual having legitimate privacy concerns may wish to prevent a search company from knowing about the individual's web search or online interactions, (e.g., likes, dislikes, etc.). In addition, an employee having business security concerns may wish to prevent revelation of business information that is contained in a web search (i.e., a technologist's search for "improving semiconductor effectiveness via use of a silicon base substrate" or an investment banker's search for "short term drop in the valuation of company XYZ.") Thus, there are many reasons that users would like to prevent search companies from having a very accurate knowledge about their searches, particularly as potentially sensitive information can be inferred from search queries, such as income level, health issues, or political beliefs.

There have been different solutions proposed for protecting the privacy of web searches, such as connecting to search engines through an anonymous web browsing systems, concealing the user's search queries by using private information retrieval (PIR) systems, concealing the user's search profile, inserting randomly-generated search queries to hide the user's actual search trail (e.g., TrackMeNot), disguising search query words by adding masking keywords (e.g., GooPIR), and other obfuscation-based web search privacy systems. However, such solutions add cost and complexity to the search process, such as requiring the search engine to implement and run the encryption security protocols or requiring widespread adoption of obfuscation-based systems to reduce the economic incentives for performing mass sophisticated profiling. In addition, the increasing sophistication of search profiling tools diminishes the effectiveness of obfuscation-based systems which use randomized search queries with statically mined terms when such search queries can be detected and disregarded by the search provider. As a result, the existing solutions for providing web searches with privacy and security protections are relatively static, do not broadly address the problems noted above, and/or are extremely difficult at a practical level.

SUMMARY

Broadly speaking, selected embodiments of the present disclosure provide an obfuscation-based web search system, method, and apparatus for enabling users to search for information while concealing their interests by using a cognitive agent to dynamically generate a user search behavior profile over time (e.g., via machine learning, statistical modeling, natural language processing, and identification of intent, object relationships, etc.) which is used to emulate user search behavior by automatically generating additional searches in order to obfuscate the user's real search queries. In selected embodiments, user search behavior emulation is achieved via a cognitive agent which applies machine learning to better understand and emulate user search behavior in terms of "when" the user performs searches, "how" the user issues and interacts with searches, and "what" is the subject of the user search. For example, by learning the timing of "when" the user typically performs searches, the user search behavior profile can be used to generate obfuscating searches at typical search times for the user, in contrast to conventional search privacy systems which, by generating searches at atypical times (e.g., 3 AM when the user is known to be sleeping), can readily be detected and discarded by today's increasingly sophisticated search engines. In addition, the ability to learn the user behavior in terms of "how" the user performs searches is important part of generating credible obfuscating search queries since today's increasingly sophisticated search engines track more than just search terms when evaluating a user's search queries. To this end, by learning the user's search behavior (e.g., how long the user stays on a particular page, what subsequent links the user follows from that page, and other interaction behavior by the user), the user search behavior profile can be used to generate obfuscating searches which accurately reflect the user behavior, in contrast to conventional search privacy systems which, in simply injecting a number of additional search queries along with the real query, can be readily detected by search engines which can identify the real user query as the real user query will have followed additional links from the initiate query. In addition, by learning the content of "what" the user is searching for and using cognitive techniques (e.g., natural language processing, dictionary tools, concept expansion, etc.) to generate topic oriented queries, the user search behavior profile can be used to generate additional, obfuscating search terms which camouflage or hide the true intent of the search queries.

The foregoing is a summary that is provided to introduce a selection of concepts in a simplified form that are further described hereinbelow and thus contains, by necessity, simplifications, generalizations, and omissions of detail; consequently, those skilled in the art will appreciate that the summary is illustrative only and is not intended to identify key factors or essential features of the claimed subject matter, nor is it intended to be used to limit the scope of the claimed subject matter. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
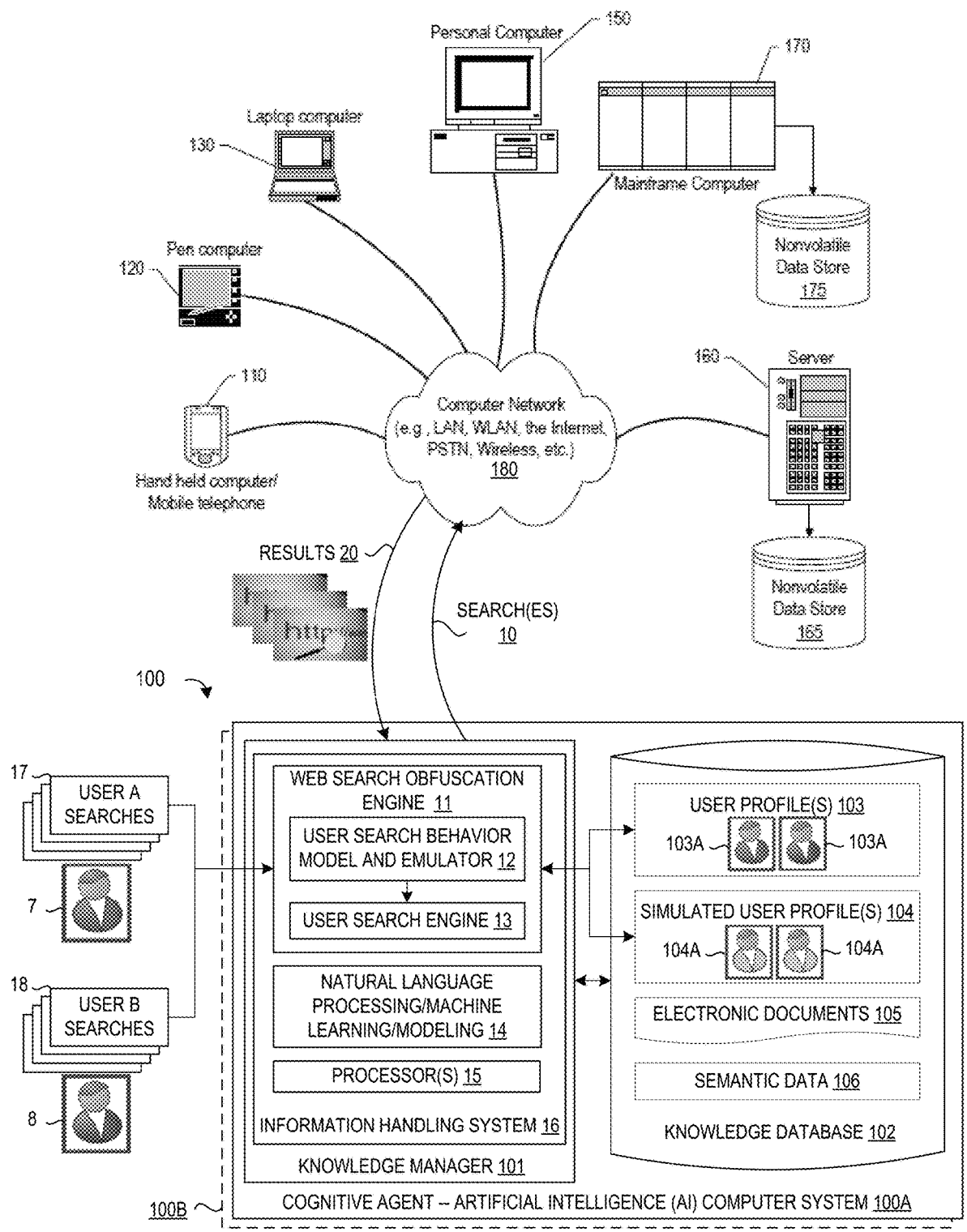
FIG. 1 depicts an example diagram of a distributed data processing system in which aspects of the illustrative embodiments may be implemented.

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, method, and/or computer program product is operative to improve the functionality and operation of a data processing system for helping users maintain privacy and/or security for their web search queries by providing using a cognitive agent to emulate the actual user's search behavior profile by learning the user behavior of when searches are performed, what topics are search on, and how the user interacts with the search-queries so that the cognitive agent can generate obfuscating search queries that look exactly like a real user search.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a distributed data processing system in which an artificial intelligence (AI) computer system 100 is connected over a network 180 to a network of computing devices (e.g., 110, 120, 130, 140, 150, 160, 170). The artificial intelligence (AI) computer system 100 may be embodied as a cognitive agent having one or more system pipelines 100A, 100B, each of which includes a knowledge manager computing device 101 (comprising one or more processors and one or more memories, and potentially any other computing device elements generally known in the art including buses, storage devices, communication interfaces, and the like) and a knowledge database 102 which are connected to receive user search queries 17, 18 from one or more users (e.g., User A 7, User B 8) and to generate one or more search queries 10 which are submitted over the network 180 to search engines and/or one or more computing devices (e.g., 110, 120, 130, 140, 150, 160, 170). Generally speaking, the cognitive agent AI computer system 100 leverages one or more processors 15 to execute one or more AI programs 14 for processing natural language inputs to provide dynamic learning of the user's search behavior over time via machine learning, statistical modeling, and natural language processing, including speech recognition, intent identification, object relationships, etc. An example implementation of a cognitive agent AI computer system 100 is the IBM Watson™ QA system available from International Business Machines Corporation of Armonk, N.Y., which is augmented with the mechanisms of the illustrative embodiments described hereafter. The IBM Watson™ knowledge manager system 101 may apply an artificial intelligence (AI) engine (e.g., IBM Watson, etc.) to perform advanced language processing on structure, semi-structured, or unstructured information contained receive input search queries 17, 18 to learn, build, and store one or more user profiles 103 and/or simulated user profiles 104 which may be leveraged by the web search obfuscation engine 11 to emulate the user and automatically generate additional searches at the user search behavior model and emulator 12 for submission to the user search engine 13 in order to obfuscate the real user searches.

The web search queries 10 generated by the user search engine 13 may be sent over the network 180 to the computing devices (e.g., 110, 120, 130, 140, 150, 160, 170) which communicate with each other and with other devices or components via one or more wired and/or wireless data communication links, where each communication link may comprise one or more of wires, routers, switches, transmitters, receivers, or the like. In this networked arrangement, the AI computer system 100 may use the AI programs 14 in the knowledge manager 101 to model a user's search behavior or a simulated user's search behavior for storage in the knowledge database 102 as one or more user profiles 103, 104 which may be leveraged by the web search obfuscation engine 11 to automatically generate additional searches which obfuscate the user's real searches. Other embodiments of AI computer system 100 may be used with components, systems, sub-systems, and/or devices other than those that are depicted herein.

In the AI computer system 100, the knowledge manager 101 may be configured to receive inputs from various sources. For example, knowledge manager 101 may receive input from the network 180, one or more knowledge bases or corpora of electronic documents 102 which stores electronic documents 105, semantic data 106, or other possible sources of data input. In selected embodiments, the knowledge database 102 may include structured, semi-structured, and/or unstructured content in a plurality of documents that are contained in one or more large knowledge databases or corpora. The various computing devices (e.g., 110, 120, 130) connected over the network 180 may include access points for content creators and content users. Some of the computing devices may include web search engines which receive web search queries 10 from the AI computer system 100 and generate search results 20 in response thereto. The network 180 may include local network connections and remote connections in various embodiments, such that knowledge manager 101 may operate in environments of any size, including local and global, e.g., the Internet. Additionally, knowledge manager 101 may serve as an intermediary or a front-end system that can prevent search engines from determining the exact topic or intent of a user's search by modeling and emulating the user's search behavior profile in terms of when to search, what topics to search on, how to follow a search-queries, etc., so that obfuscating searches can be generated which look exactly like a real user search.

As shown in FIG. 1, one or more of the computing devices, e.g., server 100, may be specifically configured to implement a web search obfuscation engine 11 which uses natural language processing, machine learning, and/or statistical modelling 14 to model and store user profiles 103A, 103B based on received user searches 17-18 from one or more real users 7-8, to generate, store, and/or retrieve one or more emulated search profiles 104A, 104B for one or more fictional users, and to generate therefrom one or more obfuscating search queries for submission along with the user's real search queries 17-18 to the user search engine 13 which issues the web searches 10. The configuring of the computing device may comprise the providing of application specific hardware, firmware, or the like to facilitate the performance of the operations and generation of the outputs described herein with regard to the illustrative embodiments. In addition or in the alternative, the configuring of the computing device may include storing software applications in one or more storage devices and loaded into memory of a computing device, such as server 101, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates search obfuscation through the use of cognitive agent services which closely model and/or emulate the user's search behavior when injecting additional searches for the purpose of obfuscation. In some illustrative embodiments, the web search obfuscation engine 11 may further interface with other computing devices to generate obfuscating searches so as to reduce the overall utility of search profiles used by search companies to data mine user web search behavior.

To improve the quality of obfuscating searches generate by the cognitive agent AI computer system 100, the web search obfuscation engine 11 may be embodied as part of an information handling system 16 in the knowledge manager 101, or as a separate information handling system. Thus embodied, the information handling system 16 executes a web search obfuscation process that uses a user search behavior model and emulator 12 and/or one or more AI programs 14 to generate obfuscating searches. To this end, the user search behavior model and emulator 12 comprises logic to perform operations, as described in more detail hereafter, for extracting search content and user behavior from submitted search queries 17, 18 from one or more actual users 7, 8 and for learning and storing corresponding user profile models 103A-B. In addition, the user search behavior model and emulator 12 may comprise logic to perform operations, as described in more detail hereafter, for generating and/or retrieve simulated user profiles 104 which can be used to emulate the actual user profile in terms of search behavior in the course of generating obfuscating searches that look exactly like real searches from the actual users 7, 8. The user search engine 13 comprises logic to perform operations, as described in more detail hereafter, for generating user searches 10 from the user search queries 17, 18 and/or from the obfuscating searches such that the searches 10 appear to be real user searches, even though the search content from the obfuscating searches enhances the query-based and/or profile-based privacy properties of the user's search behavior.

As noted above, the mechanisms of the illustrative embodiments utilize specifically configured computing devices, or data processing systems, to perform the operations for enhancing the query-based and/or profile-based privacy properties of the user's search behavior. These computing devices, or data processing systems, may comprise various hardware elements which are specifically configured, either through hardware configuration, software configuration, or a combination of hardware and software configuration, to implement one or more of the systems/subsystems described herein. For example, selected embodiments of the present disclosure can be implemented in whole or in part with different types of information handling systems that can range from small handheld devices, such as the handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, server 160, and mainframe computer 170. As shown, the various information handling systems can be networked together using computer network 180. Types of computer network 180 that can be used to interconnect the various information handling systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores. For example, server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
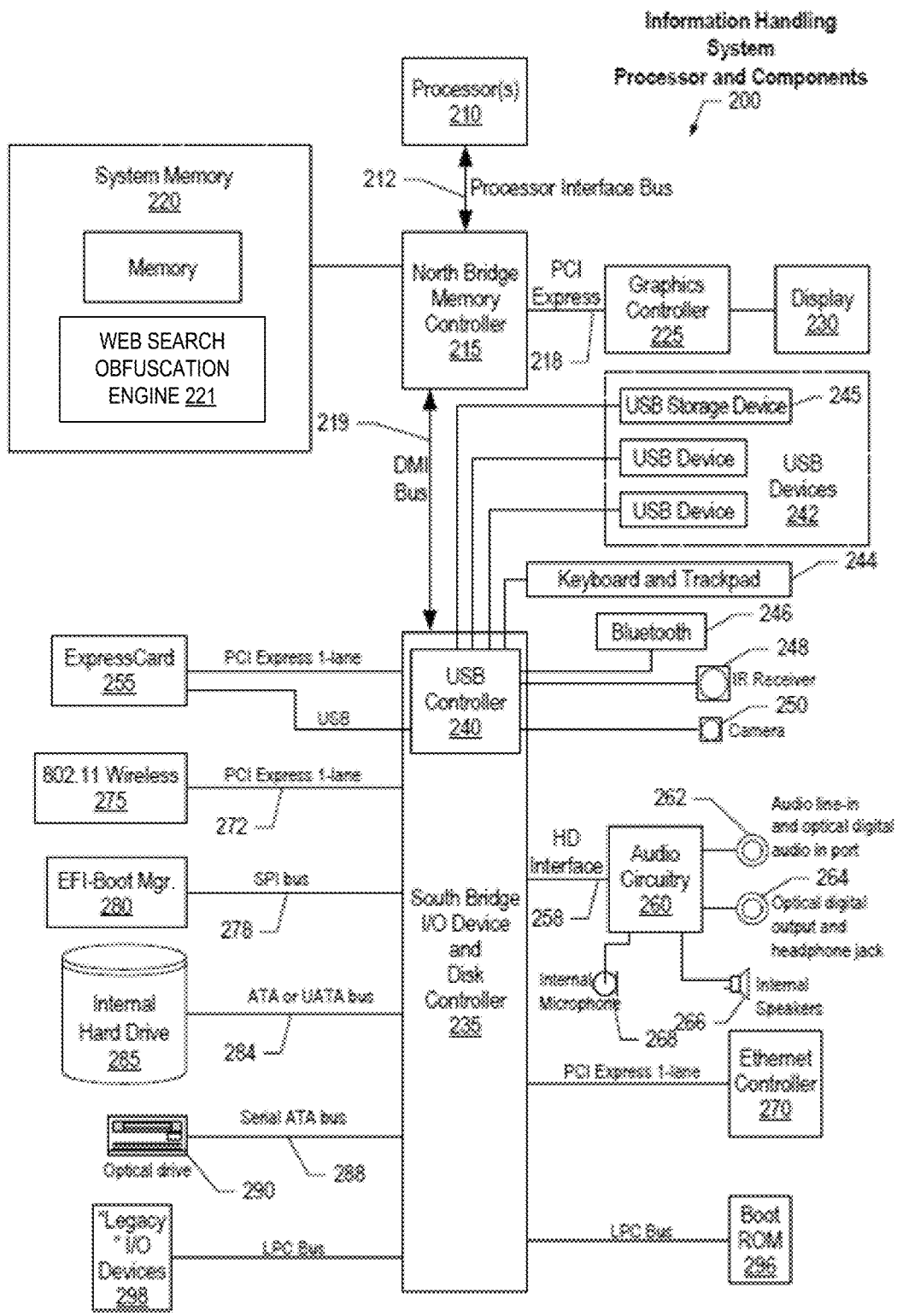
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including a web search obfuscation engine 221 which may be invoked to process user search queries using cognitive processing services (such as natural language processing, machine learning, and/or statistical modeling) to learn or model the user's search behavior profile for use in generating obfuscating web searches which hide or camouflage the real user searches. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
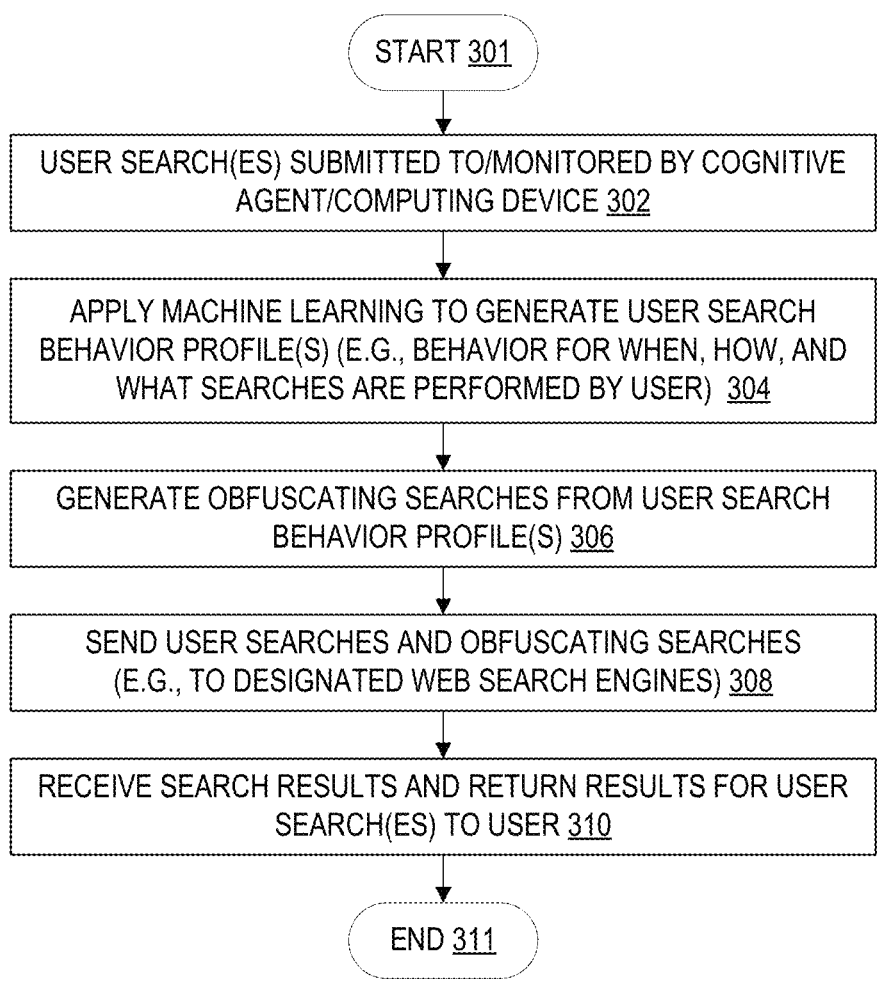
FIG. 3 illustrates a simplified flow chart showing the logic for generating obfuscating web searches in accordance selected embodiments of the present disclosure.

To provide additional details for an improved understanding of selected embodiments of the present disclosure, reference is now made to FIG. 3 which depicts a simplified flow chart showing the logic and processing steps 300 for generating obfuscating web searches in accordance with selected embodiments of the present disclosure. The processing shown in FIG. 3 may be performed by a cognitive system, such as the cognitive agent AI computer system 100 or other natural language processing system which cognitively models search content and search behavior in one or more user profiles and/or simulated user profiles for use in generating obfuscating user searches which may be sent to search companies to help hide the true search content from user searches.

As shown in FIG. 3, processing commences at 301 whereupon, at step 302, a user submits one or more search queries, either directly to a cognitive agent or to a computing device which is monitored by the cognitive agent. The processing at step 302 may be performed at the computer system 100 or any desired information processing system for processing user search queries at a web search engine which generates web search requests.

After receiving the user search query(s), one or more cognitive services are applied to generate a user search behavior profile for the user at step 304. The processing at step 304 may be performed at the computer system 100 or other natural language processing and machine learning system, though any desired information processing system for processing search queries may be used. As described herein, a Natural Language Processing (NLP) routine may be used to process the received user search queries and to generate therefrom a user search behavior profile which characterizes when, how, and/or what the user is searching for. In this context, NLP is related to the area of human-computer interaction and natural language understanding by computer systems that enable computer systems to derive meaning from human or natural language input. In addition or in the alternative, any desired machine learning techniques may be applied to construct and create a user profile from a user's search behavior. Over time, the machine learning is applied continuously so the user profile dynamically reflects the user's actual search behavior.

As a result of the processing at step 304, a user search behavior profile is built for each user submitting search queries, where the user search behavior profile is a machine understandable codification of the user's search behavior. In selected embodiments, the user profile may contain, but is not limited to, information identifying the user's actual search queries and the associated obfuscation search queries, such as by separately maintaining information on what the user has actually searched for, as well as what the cognitive agent has used for obfuscation searches in the past. In addition or in the alternative, the user profile may contain, but is not limited to, information identifying the user's search schedule (e.g., the times or dates when the user performed searches) so that any obfuscation searches better model the distribution of the real user's searches made across a given time period. For example, most people sleep at nights, so sending simulated searches during hours that the specific user normally would not perform searches can actually help external agents to filter out simulated searches. In addition or in the alternative, the user profile may contain, but is not limited to, information identifying the user's search processing and/or search interaction behavior. For example, the machine learning processing at step 304 may learn how long the user stays on a page after following a search result link to determine if the resulting link contains the information the user is looking for, or may learn how many of the top search results the user typically checks before abandoning, restarting, or refining a search query, or may learn how often the user revisits a past search.

To generate the user search behavior profile at step 304, the cognitive agent observes the user's overall search behavior, including what the user searches on, when the user performs searches, and how the user processes the search results. Based on the observations of the user's search behavior, the cognitive agent can then build models for the different aspects of the user's search behavior. In selected embodiments, statistical models may be used to model the user's behavior, but simpler models may be used for some aspects of the overall user behavior. For example, an implementation of the cognitive agent may use a simple "black out" time scheme to track when the modeled user performs searches (i.e., the user searches only between 7 PM-midnight on weekdays from the home device). As the "when," "how," and "what" behavior for the user searches is learned, the cognitive agent codifies and stores the user's search behavior (e.g., static data such as search queries, modeling data, etc.) as a user search behavior profile.

After codifying the user's search behavior in the user profile, one or more cognitive services are applied to generate obfuscating searches from the use profile at step 306. The processing at step 306 may be performed at the computer system 100 or other natural language processing and machine learning system, though any desired information processing system for processing search queries may be used. In selected embodiments, a cognitive agent may use the user search behavior profile to more completely emulate the user's search behavior when generating additional searches for the purpose of obfuscation. In selected embodiments, the cognitive agent may obfuscate the user searches by performing one or more processing steps on the user profile in any desired sequence before, during, or after the user's actual search session.

One example methodology for generating an obfuscating search at step 306 is for the cognitive agent to apply natural language processing on the terms from a user's submitted search to generate a list of similar terms and/or dissimilar terms. For example, if the user submits the search term {pizza}, the cognitive agent may generate similar (food) terms such as {fry rice, bbq, cajun} and dissimilar terms {car, music player, hiking}. Additionally, the cognitive agent may generate additional terms from the dissimilar term list (for example, {car} may be expanded to {"jeep, motorcycle, truck"}) to further mask the searches in terms of frequency. Without the additional dissimilar terms, a search engine would be able to identify the search class (e.g., food) since it will see 4 food related terms and 3 other non-food related terms, but by adding additional dissimilar terms, the search class can be disguised. As will be appreciated, the specific number of similar and dissimilar terms can be adjusted as desired by the user or set randomly.

In another example methodology for generating an obfuscating search at step 306, the cognitive agent may randomize the set of search terms to be submitted. In this way, when the cognitive agent submits the searches and returns the search result to the user for the user search term, the user can follow any of the result links and continue the normal search session. One usability option in this method is to allow the cognitive agent to "schedule" the search so that not all of the search terms are submitted simultaneously or very close to each other in time. By spreading out the obfuscation searches in time, search engines cannot easily detect the obfuscation searches, in contrast to situations where a large number of requests arrive from the same computing device within too small a window for a human to process. However, there may be performance tradeoffs for allowing the cognitive agent to schedule and supply the results since the user will have to wait until the scheduled search window, but the agent controlled scheduling will help hide the intent of the user's searches.

In addition, the generation of obfuscating searches at step 306 at the cognitive agent may use information from the user search behavior profile to schedule visits to one or more of the search result links from the user's queries and/or from the obfuscating search queries. In this way, the cognitive agent emulates the behavior of the user to legitimize the search requests from the perspective of the web search engines.

At step 306, obfuscating searches may also be generated when the cognitive agent generates or retrieves one or more emulated user profiles for fictional users, such as a family or household members who do not actually exist. Leveraging the emulated user profile(s), the cognitive agent can submit emulated search queries, thereby preventing or impairing the search provider from building an accurate profile for the actual users at the household.

At step 306, the cognitive agent may also generate obfuscating searches by using the user search behavior profile to initiate search queries even when the user is not actually in a search session on the computing device. These generated searches can be completely new searches using random topics and/or NLP terms not used in one of the past searches. The generated searches can also use search terms generated by the cognitive agent (for example, "bbq" from the above example) to simulate a user revisiting an old search.

Once the obfuscating searches are generated, they may be submitted to the designated web search engines along with actual user searches at step 308. In selected embodiments, one or more search engines will receive not only the user's actual search queries, but also additional, obfuscating search queries that look exactly like the actual user queries (due to the queries being submitted emulating the user search behavior), but with additional search content that is selected to hide or obscure the actual user search content. As the additional obfuscating queries leverage NLP to inject additional queries of both similar and dissimilar terms, it will be extremely difficult for any search engine to identify the actual user query or even the category of the query.

The processing at step 308 may be performed at the computer system 100 or other web search system, though the searches need not be limited to web browsers so that any desired information processing system for submitted search queries may be used. For example, selected embodiments of the present disclosure may use a cognitive agent to drive search obfuscation with other types of searches, such as with applications which interact with web search engines via the provided search APIs so that a cognitive agent with the right plugins to drive these types of applications can provide the same obfuscation capabilities to these applications. Additionally, other forms of search, such as internal enterprise search services, can also leverage this disclosure for search obfuscation.

At step 310, the search results from the search engines are received, including the results for the user searches and the obfuscating searches. The processing at step 310 may be performed at the computer system 100 or other information processing system for processing search query results. In this way, the results for the user's actual searches may be returned to the user, while the results from the obfuscating searches may be discarded, stored, or further processed in accordance with the codified user search behavior profile. The processing methodology at steps 302-310 may be iterative repeated to continually model and obfuscate the user search behavior and/or may be terminated at some predetermined basis (step 311).

As disclosed herein, illustrative embodiments provide mechanisms for modeling a user's search behavior in terms of the search content, timing, and/or interaction history for purposes of obtaining a user profile that can accurately generate misleading or obfuscating searches. As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

By now, it will be appreciated that there is disclosed herein a system, method, apparatus, and computer program product for modeling search behavior at an information handling system having a processor and a memory. As disclosed, the system, method, apparatus, and computer program receive one or more user search inquiries from a first user. On the user search inquiries, the information handling system performs cognitive analysis automatically create a user search behavior profile which models the first user's search timing, search location, search duration, search interaction, and search content. In selected embodiments, the cognitive analysis is performed by using natural language processing (NLP) and analytic analysis on the user search inquiries to determine the user search behavior profile for the first user which characterizes information related to the first user. The user search behavior profile may be stored or exported for subsequent use by the first user or other users. Subsequently, the information handling system may generate one or more obfuscating search inquiries consistent with the user behavior search profile for the first user. In selected embodiments, the obfuscating search inquiries may include a first additional obfuscating search inquiry which is generated to be issued in accordance with search time and search behavior parameters specified in the user behavior search profile for the first user, where the first additional obfuscating search inquiry includes topic oriented query terms comprising additional terms that are similar and dissimilar to search terms in the one or more user search inquiries from the first user. In other embodiments, the obfuscating search inquiries may be generated by generating one or more emulated user behavior search profiles for one or more emulated users, and then generating one or more additional obfuscating search inquiries consistent with the one or more emulated user behavior search profiles for issuance with the one or more user search inquiries and the one or more obfuscating search inquiries to the search engine. Once the obfuscating search inquiries are generated, the information handling system issues the user search inquiries to a search engine along with the obfuscating search inquiries to impair the search engine from accurately characterizing search information related to the first user. In addition, the information handling system may access one or more websites to emulate the first user's search behavior specified in the user search behavior profile. In various embodiments, the search engine searches from applications selected from a group consisting of web search browsers, editors, native and remote. Once the search results are received from the search engine in response to the user search inquiries and the obfuscating search inquiries, the information handling system may return to the first user the search results responsive to the one or more user search inquiries.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of modeling search behavior comprising:
   receiving, by an information handling system comprising a processor and a memory, one or more user search inquiries from a first user;
   performing, by the information handling system, cognitive analysis using machine language learning, statistical modeling, and natural language processing (NLP), including speech recognition, intent identification, and object relationships, on the one or more user search inquiries to automatically create a user search behavior profile which characterizes the first user's search content and search behavior in terms of the first user's search timing, search location, search duration, and search interaction characterizing how the first user processes search results, how long the first user stays on a page after following a search result link to determine if a resulting link contains information the first user is looking for, how many search results the first user typically checks before abandoning, restarting, or refining a search query, and how often the first user revisits a past search;
   generating, by the information handling system, one or more obfuscating search inquiries which include search terms that differ from search content in the user search behavior profile and which are consistent with the search behavior in the user search behavior profile; and issuing, by the information handling system, the one or more user search inquiries to a search engine along with the one or more obfuscating search inquiries to impair the search engine from accurately characterizing search information related to the first user.

2. The method of claim 1, further comprising storing or exporting the user search behavior profile.

3. The method of claim 1, further comprising accessing, by the information handling system, one or more websites to emulate the first user's search behavior specified in the user search behavior profile.

4. The method of claim 1, further comprising:
receiving, by the information handling system, search results from the search engine in response to the one or more user search inquiries and the one or more obfuscating search inquiries; and
returning, by the information handling system, to the first user the search results responsive to the one or more user search inquiries.

5. The method of claim 1, where the search engine searches from applications selected from a group consisting of web search browsers, editors, native and remote.

6. The method of claim 1, where generating one or more obfuscating search inquiries comprises generating, by the information handling system, a first additional obfuscating search inquiry to be issued in accordance with search time and search behavior parameters specified in the user behavior search profile for the first user, where the first additional obfuscating search inquiry includes topic oriented query terms comprising additional terms that are similar and dissimilar to search terms in the one or more user search inquiries from the first user.

7. The method of claim 1, where generating one or more obfuscating search inquiries comprises:
generating, by the information handling system, one or more emulated user behavior search profiles for one or more emulated users; and
generating, by the information handling system, one or more additional obfuscating search inquiries which include search terms that differ from search content in the user search behavior profile and which are consistent with the search behavior in the one or more emulated user behavior search profiles for issuance with the one or more user search inquiries and the one or more obfuscating search inquiries to the search engine.

8. A computer program product comprising a computer readable storage medium having a computer readable program stored therein, wherein the computer readable program, when executed on an information handling system, causes the system to model search behavior by:
receiving one or more user search inquiries from a first user;
performing cognitive analysis using machine language learning, statistical modeling, and natural language processing (NLP), including speech recognition, intent identification, and object relationships, on the one or more user search inquiries to automatically create a user search behavior profile which characterizes the first user's search content and search behavior in terms of the first user's search timing, search location, search duration, and search interaction characterizing how the first user processes search results, how long the first user stays on a page after following a search result link to determine if a resulting link contains information the first user is looking for, how many search results the first user typically checks before abandoning, restarting, or refining a search query, and how often the first user revisits a past search;
generating one or more obfuscating search inquiries which include search terms that differ from search content in the user search behavior profile and which are consistent with the search behavior in the user search behavior profile; and
issuing the one or more user search inquiries to a search engine along with the one or more obfuscating search inquiries to impair the search engine from accurately characterizing search information related to the first user.

9. The computer program product of claim 8, wherein the computer readable program, when executed on the system, causes the system to perform cognitive analysis by using natural language processing (NLP) and analytic analysis to determine the user search behavior profile for the first user which characterizes information related to the first user.

10. The computer program product of claim 8, wherein the computer readable program, when executed on the system, causes the system to store or export the user search behavior profile.

11. The computer program product of claim 8, wherein the computer readable program, when executed on the system, causes the system to access one or more websites to emulate the first user's search behavior specified in the user search behavior profile.

12. The computer program product of claim 8, wherein the computer readable program, when executed on the system, causes the system to:
receive search results from the search engine in response to the one or more user search inquiries and the one or more obfuscating search inquiries; and
return to the first user the search results responsive to the one or more user search inquiries.

13. The computer program product of claim 8, where the search engine searches from applications selected from a group consisting of web search browsers, editors, native and remote.

14. The computer program product of claim 8, wherein the computer readable program, when executed on the system, causes the system to generate one or more obfuscating search inquiries by generating a first additional obfuscating search inquiry to be issued in accordance with search time and search behavior parameters specified in the user behavior search profile for the first user, where the first additional obfuscating search inquiry includes topic oriented query terms comprising additional terms that are similar and dissimilar to search terms in the one or more user search inquiries from the first user.

15. The computer program product of claim 8, wherein the computer readable program, when executed on the system, causes the system to generate one or more obfuscating search inquiries by:
generating one or more emulated user behavior search profiles for one or more emulated users; and
generating one or more additional obfuscating search inquiries which include search terms that differ from search content in the user search behavior profile and which are consistent with the search behavior in the one or more emulated user behavior search profiles for issuance with the one or more user search inquiries and the one or more obfuscating search inquiries to the search engine.

16. An information handling system comprising: one or more processors;
a memory coupled to at least one of the processors;
a set of instructions stored in the memory and executed by at least one of the processors to model search behavior, wherein the set of instructions are executable to perform actions of:
receiving, by the system, one or more user search inquiries from a first user;
performing, by the system, cognitive analysis on the one or more user search inquiries to identify a user search behavior profile for the first user by using natural language processing (NLP), statistical modeling, and machine language learning to automatically create a user search behavior profile which characterizes the first user's search content and search behavior in terms of the first user's search timing, search location, search duration, and search interaction characterizing how the first user processes search results, how long the first user stays on a page after following a search result link to determine if a resulting link contains information the first user is looking for, how many search results the first user typically checks before abandoning, restarting, or refining a search query, and how often the first user revisits a past search;
generating, by the system, one or more obfuscating search inquiries which include search terms that differ from search content in the user search behavior profile and which are consistent with the search behavior in the user search behavior profile;
issuing, by the system, the one or more user search inquiries to a search engine along with the one or more obfuscating search inquiries to impair the search engine from accurately characterizing search information related to the first user;
receiving by the system search results from the search engine in response to the one or more user search inquiries and the one or more obfuscating search inquiries;
accessing, by the system, one or more web sites to emulate the first user's search behavior specified in the user search behavior profile; and
returning, by the system, to the first user the search results responsive to the one or more user search inquiries.

17. The information handling system of claim 16, where generating one or more obfuscating search inquiries comprises generating, by the system, a first additional obfuscating search inquiry to be issued in accordance with search time and search behavior parameters specified in the user behavior search profile for the first user, where the first additional obfuscating search inquiry includes topic oriented query terms comprising additional terms that are similar and dissimilar to search terms in the one or more user search inquiries from the first user.

18. The information handling system of claim 16, where generating one or more obfuscating search inquiries comprises:
generating, by the system, one or more emulated user behavior search profiles for one or more emulated users; and
generating, by the system, one or more additional obfuscating search inquiries consistent with the one or more emulated user behavior search profiles for issuance with the one or more user search inquiries and the one or more obfuscating search inquiries to the search engine.

19. The information handling system of claim 16, where the search engine searches from applications selected from a group consisting of web search browsers, editors, native and remote.

* * * * *